US008122904B2

(12) United States Patent
Wholey et al.

(10) Patent No.: US 8,122,904 B2
(45) Date of Patent: Feb. 28, 2012

(54) ANTI SIPHON TANK INLET (75) Inventors: Ryan Wholey, Blackpool (GB); Alex McCracken, Blackpool (GB)

(73) Assignee: Tiss Limited, Blackpool, Lancashire (GB)

( * ) Notice: Subject to any disclaimer, the term of this patent is extended or adjusted under 35 U.S.C. 154(b) by 307 days.

(21) Appl. No.: 12/239,797

(22) Filed: Sep. 28, 2008

(65) Prior Publication Data

US 2009/0134159 A1    May 28, 2009

Related U.S. Application Data (63) Continuation of application No. PCT/GB2007/001126, filed on Mar. 28, 2007.

(30) Foreign Application Priority Data

Mar. 28, 2006  (GB) .................................. 0606126.1
Jul. 29, 2006   (GB) .................................. 0615142.7

(51) Int. Cl.
*F16K 31/18*    (2006.01)
(52) U.S. Cl. ....................................... 137/429; 220/86.3
(58) Field of Classification Search .................. 137/218, 137/429, 433, 519.5, 533.13; 251/118, 127; 220/86.1, 86.2, 86.3
See application file for complete search history.

(56) References Cited

U.S. PATENT DOCUMENTS

| 1,737,529 | A | * | 11/1929 | Viele | 137/433 |
| 1,739,852 | A | * | 12/1929 | Middleton | 220/86.3 |
| 1,766,916 | A | * | 6/1930 | MacLiver | 220/86.3 |
| 1,922,930 | A |   | 8/1933 | Darms |  |
| 1,931,335 | A | * | 10/1933 | Terry | 220/86.3 |
| 1,939,423 | A | * | 12/1933 | Wahl | 220/86.3 |
| 1,995,007 | A |   | 3/1935 | Myers |  |
| 3,016,162 | A | * | 1/1962 | Cioffi | 220/86.3 |
| 3,929,155 | A | * | 12/1975 | Garretson | 137/430 |
| 3,951,297 | A |   | 4/1976 | Martin |  |
| 4,438,862 | A | * | 3/1984 | Bona | 220/86.3 |
| 5,636,668 | A | * | 6/1997 | Thompson | 141/82 |
| 5,669,361 | A | * | 9/1997 | Weissinger et al. | 123/520 |
| 6,227,229 | B1 | * | 5/2001 | Campau | 137/260 |
| 7,584,766 | B2 | * | 9/2009 | David et al. | 137/413 |

FOREIGN PATENT DOCUMENTS

| DE | 101 31 493 A1 | 1/2002 |
| FR | 2 534 888 | 4/1984 |
| GB | 535220 | 4/1941 |

(Continued)

OTHER PUBLICATIONS

International Search Report dated Jul. 26, 2007.

(Continued)

*Primary Examiner* — Craig Schneider
*Assistant Examiner* — Craig J Price
(74) *Attorney, Agent, or Firm* — Bose McKinney & Evans LLP (57) ABSTRACT

The present invention provides a fluid tank inlet assembly having an inlet pipe extending from a mounting structure located at the proximal end of the pipe. A float valve assembly is disposed beyond the distal end of the inlet pipe and includes a float member. An obstruction is located within a housing between the inlet pipe and the float member. The obstruction blocks the line of sight or direct path between the inlet pipe and the float member, but a flow path remains and is defined between the obstruction and the housing wall to allow fluid to flow around the obstruction to the float valve assembly.

41 Claims, 7 Drawing Sheets

FOREIGN PATENT DOCUMENTS

| | | | |
|---|---|---|---|
| GB | 2 117 492 | A | 10/1983 |
| GB | 2 406 333 | A | 3/2005 |
| GB | 2 424 870 | A | 10/2006 |
| WO | WO 2007/110640 | A1 | 10/2007 |

OTHER PUBLICATIONS

Communication pursuant to Article 94(3) EPC in EU Patent App. No. 07732183.4 dated Feb. 19, 2009; 2 pages.

Response to Examination Report in EU Patent App. No. 07732183.4 dated Jul. 1, 2009; 3 pages.

Third Party Observation filed in EU Patent App. No. 07732183.4 dated Jul. 1, 2009; 3 pages.

Accelerated Examination Request in EU Patent App. No. 07732183.4 dated Mar. 19, 2010; 2 pages.

* cited by examiner

ANTI SIPHON TANK INLET

RELATED APPLICATIONS

This is a continuation application of International Application PCT/GB2007/001126, filed Mar. 28, 2007, which claims priority to GB 0606126.1, filed Mar. 28, 2006, and GB 0615142.7, filed Jul. 29, 2006, all of which are hereby incorporated by reference in their entirety.

BACKGROUND

The present invention relates to inlets for fluid tanks such as vehicle fuel tanks. In particular, the present invention relates to an anti-siphon inlet for a fluid tank such as a vehicle fuel tank.

The theft of fuel by siphoning from the fuel tanks of vehicles, and in particular commercial road vehicles, is a recognized problem. It is conventional to fit vehicles with a lockable fuel tank filler cap to prevent unauthorized access to the tank inlet. However, since the fuel filler cap is accessible it is vulnerable to tampering and can often be forced open by the determined thief. In addition, it is not always practical to fit a vehicle with a lockable fuel filler cap.

This problem has been addressed in the prior art by provision of a fluid tank inlet pipe incorporating structure to prevent insertion of a siphon tube into the tank.

For example, U.S. Pat. No. 3,951,297 discloses an anti-siphon fluid tank inlet assembly comprising a tubular inlet body which in use is secured to the normal tank inlet so that its distal end extends a short distance into the tank. The tubular inlet is designed to receive a conventional fuel dispensing nozzle. A conically-shaped guard member is provided at the open distal end of the tubular inlet so that an annular gap is defined between the conical member and the interior of the tubular body to allow fuel to flow from the dispenser nozzle into the tank. Breather holes are provided in the tubular inlet adjacent the tank inlet to allow the escape of air/gas from the tank as it is filled. The conical guard member is provided to prevent insertion of a siphon tube through the tubular inlet and into the tank below. A problem with this simple device is that it is still possible to siphon fuel from the tank when the fuel level is above the height of the distal end of the tubular inlet. Although the tubular body may only extend a relatively short distance into the tank, for instance of the order of 20 cm, this can nevertheless leave exposed a significant volume of fuel.

The above problem is addressed by anti-siphon inlet assemblies provided with a float valve as, for instance, disclosed in the applicant's co-pending GB patent application number GB 0 322 594. This has a float valve provided at the inner (distal) end of an inlet pipe. The float valve comprises a ball float retained in an apertured float chamber (or cage) and which seats against a valve seat defined at the end of the inlet pipe when the fuel level in the tank is above the end of the inlet pipe to thereby prevent fuel flow back through the pipe. A grill is fitted in the inlet pipe above the valve seat to prevent a siphon tube from being used to force the ball valve away from its seat. If the fuel level in the tank lies below the end of the inlet pipe, the ball valve will simply drop away from its seat allowing fuel flow through the apertures in the float chamber. Nevertheless, the grill will prevent insertion of a siphon tube into the fuel. When the fuel level is above the end of the inlet pipe, fuel can still flow through the float valve under pressure from the dispensing nozzle. With this assembly only fuel which may be present within the inlet pipe itself can be siphoned. Breather holes are provided in the inlet pipe towards the upper end of the pipe at the inlet to the tank, but at a height which will typically be above the maximum filling level of the tank.

Further examples of anti-siphon inlet assemblies provided with a float valve are disclosed in U.S. Pat. No. 1,995,007 and French Patent FR2534888.

In some cases, however, it may be possible to insert an elongate rigid member, such as a stiff length of wire, into the inlet assembly and through the grill protecting the float valve assembly in order to push the float member away from its seat. If this is done, it could then be possible to siphon off any fuel at a level above the level of the grill within the inlet pipe.

SUMMARY OF THE INVENTION

The present invention provides a fluid tank inlet assembly which obviates or mitigates the above-described problem. According to a first aspect of these teachings, a fluid tank inlet assembly comprises an inlet pipe extending from a mounting structure or member located at its proximal end, a float valve assembly disposed beyond the distal end of the inlet pipe and including a float member, and an obstruction located within a housing and disposed between the inlet pipe and the float member. The obstruction blocks the line of sight or direct path from the inlet pipe to the float member. A flow path is defined between the obstruction and the housing wall to allow fluid to flow around the obstruction to the float valve assembly.

The obstruction prevents any straight, rigid member that may be inserted through the inlet from easily reaching the float valve. The obstruction is preferably shaped so that the flow path is annular. The annular flow path may have a uniform radial width around the obstruction (on any given plane perpendicular to the axis of the housing), or may have a radial width which varies around the circumference of the obstruction. Similarly, the annular flow path may have a radial width which is unchanging along the length of the housing, or which varies, for example, from a minimum to a maximum depending upon the geometry of the internal surface of the housing and the geometry of the obstruction.

The obstruction has a streamlined outer surface to promote freeflow of fluid between the obstruction and an inner wall of the housing. For instance, the obstruction may have a diameter which increases from its proximal end to a maximum diameter and then decreases again towards the distal end of the obstruction. For example, the obstruction may be generally egg-shaped.

The inlet assembly further comprises a rim, ledge, lip or the like defined around the internal wall of the housing, or at the inlet to the float valve, below a maximum diameter portion of the obstruction. This substantially inhibits insertion of a flexible member around the obstruction.

For instance, in one embodiment the rim is provided by an annular ring having a central aperture and a radial width, and is provided with a circumferential array of axial bores of diameter less than the radial width to allow flow of fuel therethrough. Advantageously, the ring has an annular channel defined within its radial width, the upstream openings of said bores being defined within said annular channel. The ring is a separate component secured by a screw thread or the like into a bottom portion of the housing above the entry to the flow valve chamber.

A second obstruction or blocking member, such as a grill or apertured baffle, is provided within the inlet pipe above the first obstruction, or below the first obstruction within the housing or at the entrance to the float valve, to permit flow of fluid but prevent passage of a siphon tube.

In another embodiment an annular portion of the inlet pipe has an inwardly tapering surface which will divert the end of any elongate member inserted into the inlet pipe away from the internal wall of the pipe and towards said obstruction. The tapering surface may, for example, be provided by a separate ring fitted into the inlet pipe (preferably above a second obstruction or blocking member, as discussed in the preceding paragraph).

The float valve may comprise a float trapped in an apertured float chamber which cooperates with a valve seat adjacent the housing. The float valve chamber is generally cylindrical and comprises a plurality of fluid flow slots arranged axially relative to the inlet pipe. The float may be a ball float.

According to a second aspect of these teachings, there is provided an anti-siphon fluid tank inlet assembly comprising an inlet pipe having structure to inhibit or prevent insertion of a siphon tube into the tank but allow fluid flow. The anti-siphon fluid tank assembly is provided with an internal annular flange which defines an opening to receive a fluid dispensing nozzle with an air gap therebetween. The inlet assembly may, for example, have similar features as described above with respect to the first aspect of the present invention.

The present invention is explained in more detail hereinafter on the basis of advantageous embodiments shown in the figures. The special features shown therein may be used individually or in combination to provide embodiments of the present invention.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
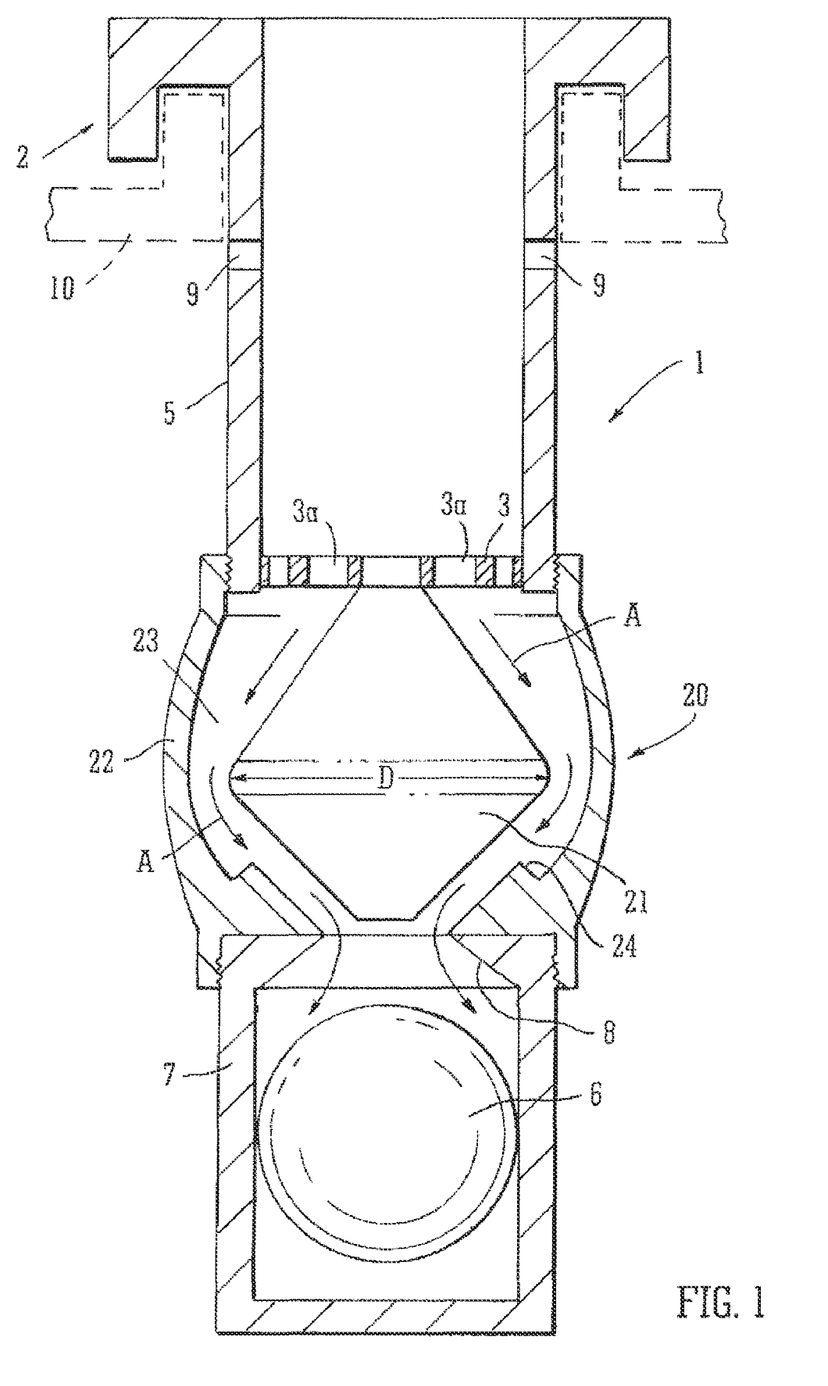
FIG. 1 is an axial cross-sectional view of an embodiment of a fluid tank inlet assembly with a float valve.
Figure 2:
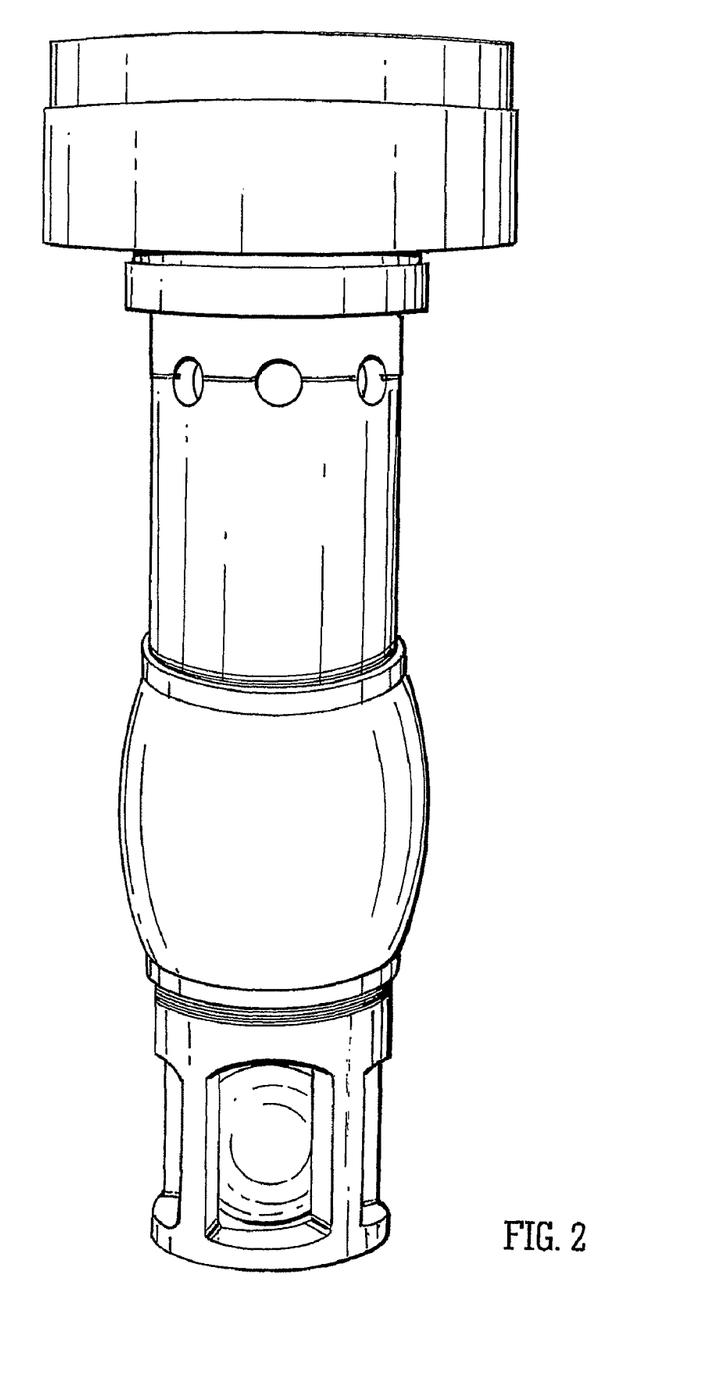
FIG. 2 is a perspective view of an embodiment of the fluid tank inlet assembly.
Figure 3:
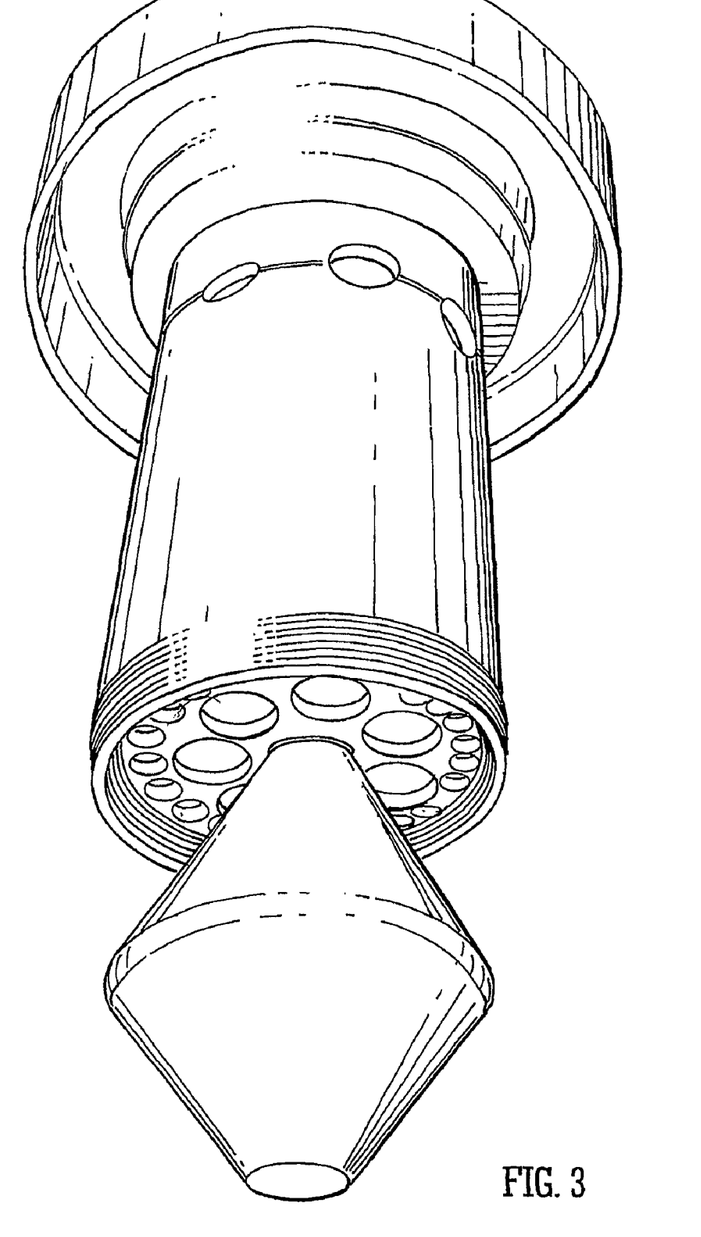
FIG. 3 is a perspective view of the fluid tank inlet assembly of FIG. 2 with the float valve removed.

With reference to FIG. 1, an exemplary embodiment of a fluid inlet assembly 1 for fitting to a fluid tank 10 is shown and it comprises a substantially straight body, or inlet pipe 5, an attachment means or mounting structure or member 2 at its proximal end and a grill or baffle plate 3 to permit the flow of liquid through the pipe 5 but block the passage of a siphon tube at its distal end. The grill 3 comprises a metal plate, provided with a plurality of fuel outlet holes 3a, and is securely attached across the internal width of the pipe 5.

The pipe 5 and grill 3 of the assembly are similar to that disclosed in the applicants' co-pending applications GB 0 322 594 and International Application No. PCT/GB2005/004259. The mounting structure or member 2, which is provided for attaching the assembly to the inlet aperture 11 of the fuel tank 10, is similar to that disclosed in International Application No. PCT/GB2005/004259, but could take any appropriate form.

In the embodiment of FIG. 1, the inlet assembly also includes a float valve comprising a float ball 6 held within a float cage 7. The float ball 6 is a spherical, hollow plastic ball. Thus, the float valve is arranged to allow the float ball 6 to be movable along the longitudinal axis of the assembly from an open position (as shown in FIG. 1) to a closed position in which the ball is held against valve seat 8 when fuel rises above the distal end of the assembly. The float valve may, for example, be substantially the same as that shown in GB 0 322 594 and International Application No. PCT/GB2005/004259, or it may take another form.

It will be appreciated that when the float valve is closed it is still possible to fill the tank with additional fuel as the fuel pressure entering the tank opens the valve against its buoyancy.

The inlet pipe 5 is provided with a plurality of vent outlets 9 spaced around its circumference adjacent to the mounting structure or member 2. These vents assist the filling of the tank by allowing gas to escape the tank as it is displaced by fuel.

In accordance with the present invention, in addition to the inlet pipe 5 and the float valve assembly 7, the inlet assembly 1 also includes an anti-tamper means 20 disposed between the end of the inlet pipe 5 and the float valve cage 7. The anti-tamper means 20 comprises an obstruction 21 located within a housing 22 configured to prevent insertion of an elongate rigid member through the inlet pipe 5, through an aperture 3a in the grill 3, and into the float valve to displace the float member 6. The obstruction 21 is substantially centrally disposed within the housing 22 and has a double conical shape so that it is generally diamond-shaped in cross-section as shown in FIG. 1. The housing 22 has a generally "bowled" internal radius to accommodate the obstruction 22 while maintaining an annular flow path 23 through which fuel can flow between the obstruction 21 and the inner wall of the housing 22 in order to reach the float valve, as shown by arrows A. The maximum diameter D of the obstruction 21 is greater than the diameter of the open end of the inlet pipe 5 and the inlet end of the float valve cage 7 (at valve seat 8) so that there is no direct line of sight or direct path from the inlet pipe 5 to the float valve member 6 past the obstruction 21. This prevents insertion of a straight rigid member through the inlet pipe 5, through an aperture 3a, and into the float cage 7 to displace the float member 6 away from the valve seat 8.

In addition, the housing 22 is provided with an internal annular lip 24 defined by its internal wall circumscribing a lower part of the obstruction 21 (below the maximum diameter portion of obstruction 21), and having a diameter less than the maximum diameter D of the obstruction 21. This substantially prevents insertion of a flexible elongate member, such as a relatively thick but deformable wire, through the inlet pipe 5 and around the obstruction 21 into the float valve.

This is because the inserted end of such a wire member will be deflected by the obstruction 21 in an outward direction towards the internal wall of the housing 22. Further insertion of the wire will then cause the inserted end of the wire to follow the contour of the internal wall of the housing 22 until the end of the wire is caught by the lip 24 preventing it from further insertion into the float valve chamber.

The relative dimensions of the internal wall of the housing 22 and the obstruction 21 are selected to ensure that the radial width of the annular gap 23 is sufficient to accommodate desired fuel dispensing speeds.

The external profile of the obstruction 21 and internal profile of the housing 22 may vary from that illustrated. The illustrated profiles are advantageous in providing the necessary obstruction to any attempt to tamper with the float valve assembly, while being sufficiently "streamlined" to allow fuel flow at acceptable filling speeds. Other profiles are, however, possible as will be appreciated by the skilled person. For instance, the obstruction 21 does not need to have the double cone shape as illustrated in FIG. 1. For instance, a simple inverted cone (with apex pointing towards the float valve assembly) will function as an effective obstruction to tampering, although it may introduce turbulence into fluid flow which undesirably limits the maximum filling rate that can be achieved. Similarly, the obstruction could have an upright cone shape, with apex pointing towards the grill 3, which again will provide obstruction to tampering, although, it too may generate some turbulence within the housing 22 which hampers fluid flow. The obstruction could alternatively be spherical, oval, egg-shaped, or a combination of portions of any of the aforementioned shapes. The obstruction 21 could even be a circular disc or the like with its diameter extending across the width of the housing 22. This will again provide the necessary obstruction to tampering, but is not the preferred shape in terms of allowing high filling speeds.

The maximum diameter D of the obstruction 21 may vary from that illustrated provided it prevents any direct line of sight or direct path through the inlet pipe 5 into the float valve chamber 7. For instance, in some embodiments, the entrance to the float valve chamber 7 may have a smaller diameter than the open end of the tubular pipe 5, in which case provided the maximum diameter D of the obstruction 21 is greater than the diameter of the entrance to the float chamber the necessary effect will be achieved. Likewise, if the open end of the inlet pipe 5 has a smaller diameter than the inlet end of the float chamber 7, the maximum diameter of the obstruction 21 need only be greater than the diameter of the open end of the inlet pipe 5. Preferably, however, the maximum diameter of the obstruction 21 is greater than both the diameter of the open, distal end of the inlet pipe 5 and the open inlet end of the float chamber 7 (as illustrated).

In the illustrated embodiment, the inlet pipe 5, anti-tamper means 20, and float valve assembly 7 are separate components which may be screw threaded to one another. This allows ease of manufacture and assembly. In addition, the obstruction 21 is mounted directly to the grill 3, for instance, by a screw thread. In alternative arrangements the obstruction 21 may be supported directly by the housing 22, for instance by narrow diameter supporting members which extend from the obstruction 21 to the internal wall of the housing 22. Other possible mounting arrangements will be apparent to the skilled person.

In the illustrated embodiment, the grill 3 is positioned in the inlet pipe 5 above the obstruction 21. In alternative embodiments the grill 3 could be positioned below the obstruction 21. For instance, the obstruction 21 may be disposed within a modified inlet pipe.

In other possible embodiments of the invention the grill 3 may be omitted entirely. However, a grill 3 or similar guard is preferred to limit the possibility of the insertion of a flexible siphon tube past the obstruction 21. The grill 3 could, however, take a variety of different forms.

The lip 24 is a preferred feature of the invention but not essential in that some protection against anti-tampering is provided simply by the obstruction 21. Similarly, the lip 24 could take a form different to that illustrated and be located in a different position. For instance, the lip 24 could be replaced by a lip or a ledge situated at the entrance to the float valve chamber rather than being defined by the internal wall of the housing 22.

Figure 4:
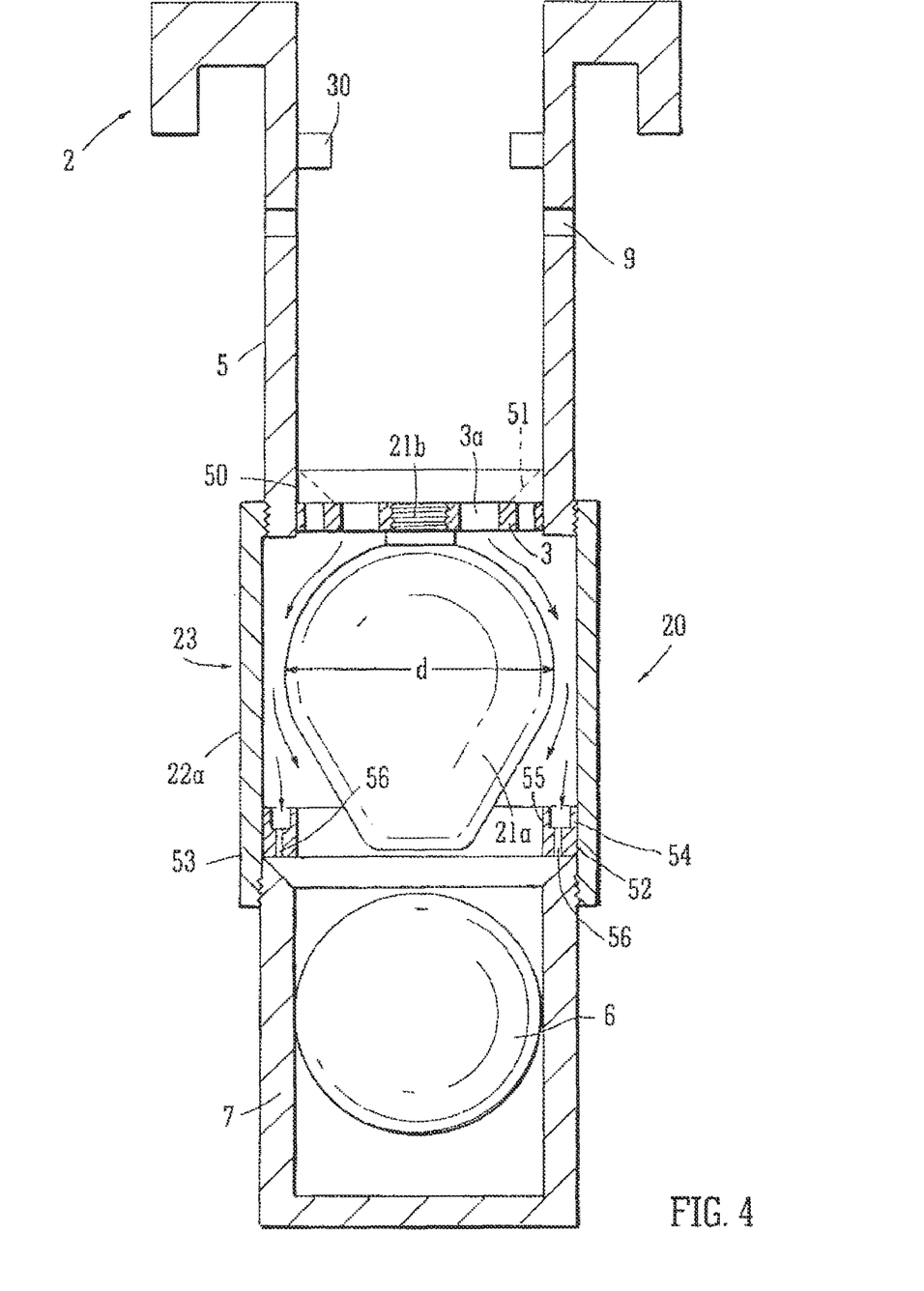
FIG. 4 is an axial cross-sectional view of a modified embodiment of the fluid tank inlet assembly of FIG. 1.

A modification of the embodiment of FIG. 1 is illustrated in FIG. 4. This is similar to the embodiment of FIG. 1 and thus the same reference numerals are used to identify corresponding components as used in FIG. 1. The embodiment of FIG. 4 differs from the embodiment of FIG. 1 in the following respects.

Figure 5A:
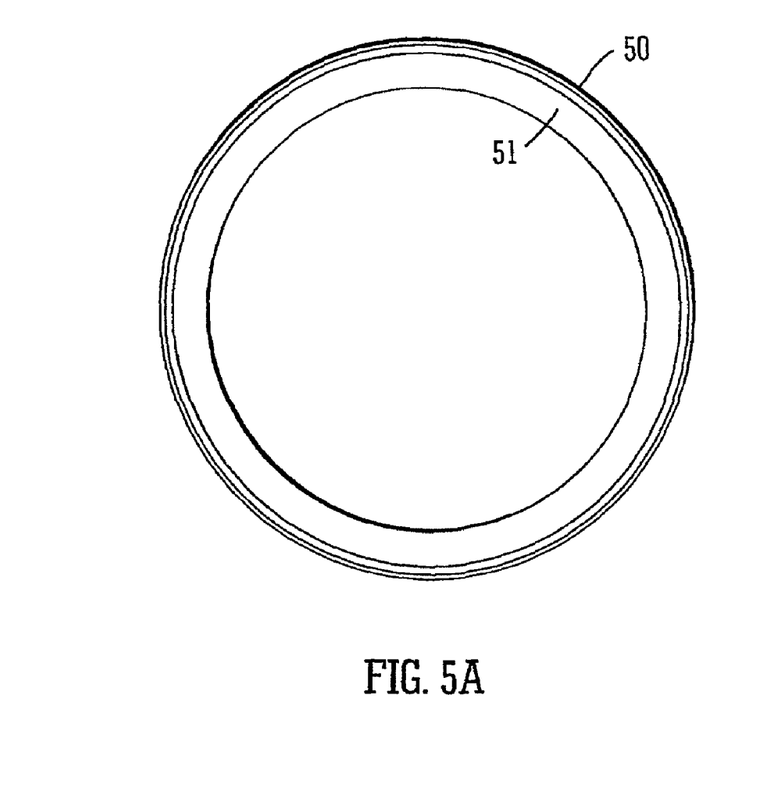
FIG. 5A is a front view of an annular ring from the embodiment of FIG. 4.
Figure 5B:
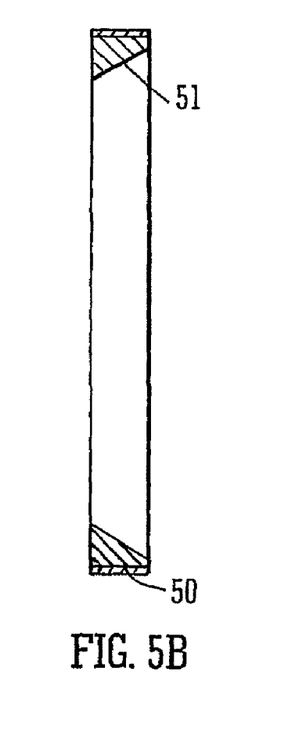
FIG. 5B is a cross-sectional view of the annular ring of FIG. 5A.

First, an annular ring 50 (shown in FIGS. 5A and 5B) with an inwardly tapering inner radius 51 is located within the bottom of the tubular body 5 just above the grill 3. The ring 50 may conveniently be provided as a separate component which is screw threaded into the body 5. The ring 50 functions to divert the end of any wire or the like pushed through the tubular body towards the obstruction 21. For instance, if the end of a relatively stiff wire is slid down the inner surface of the tubular body 5, with the aim of sliding this around the outer edge of the obstruction 21, the tapered inner radius of the ring 50 will divert the end of the wire radially inwards and away from the annular gap 23 around the obstruction 21. This therefore provides further protection against tampering.

Second, the obstruction 21a has a different geometry than the obstruction 21 of the embodiment of FIG. 1. Specifically, the obstruction 21a in FIG. 4 is generally egg-shaped with a truncated lower end. The obstruction 21a is suspended from the grill 3 by a screw threaded stem 21b which threads into a threaded hole provided in the grill 3. The obstruction 21a is disposed within a modified housing 22a which has a straight cylindrical shape rather than the bowled shape of the housing 22 of FIG. 1. The maximum diameter d of the obstruction 21a is greater than the internal diameter of the ring 50 thus blocking line of sight or direct path from the inlet pipe 5 to the float valve 7.

Figure 6A:
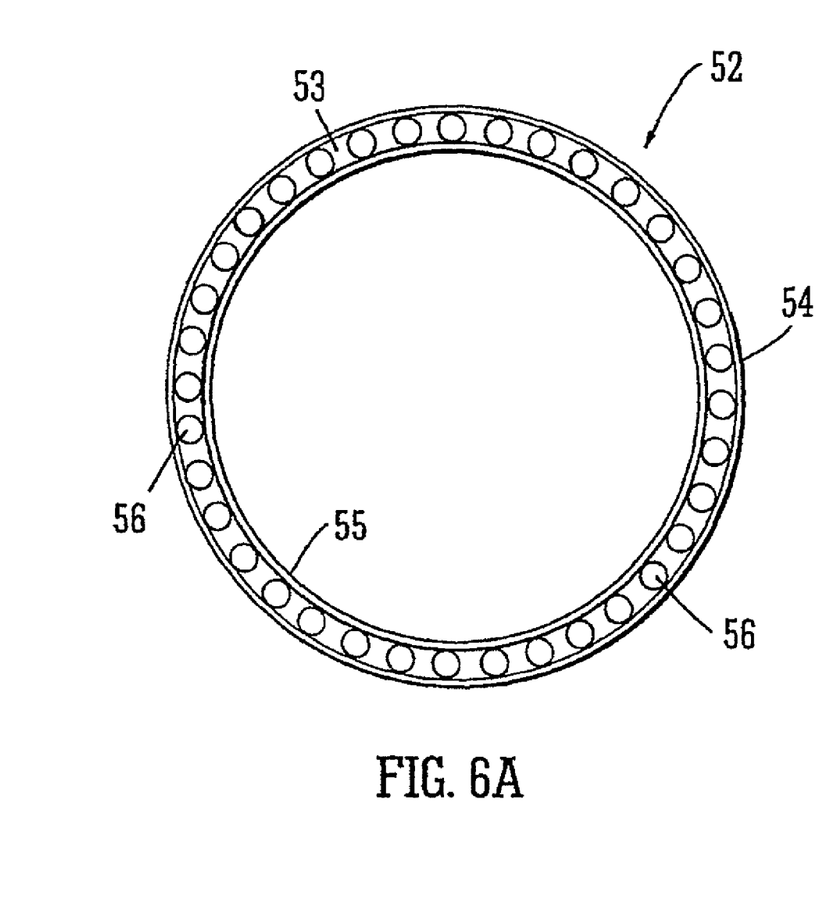
FIG. 6A is a front view of a ring from the embodiment of FIG. 4.
Figure 6B:
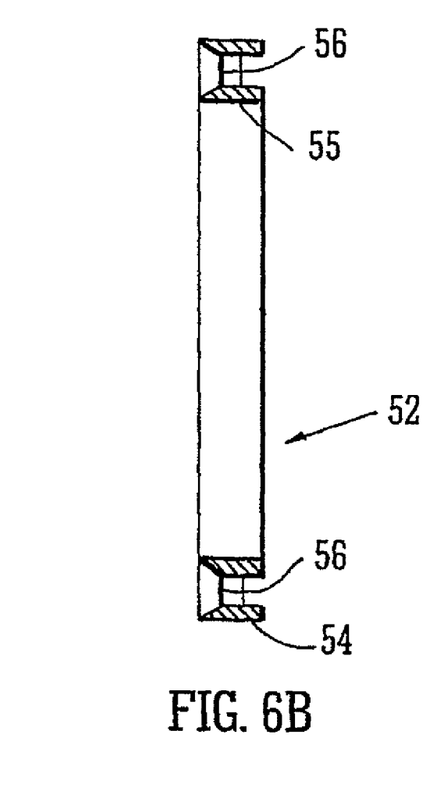
FIG. 6B is a cross-sectional view of the ring of FIG. 6A.

Third, the internal annular lip 24 is replaced by a ring 52 (shown in FIGS. 6A and 6B), which is conveniently provided as a separate component screw threaded into the housing 22. With reference to FIGS. 4 and 6, the ring 52 defines an annular channel 53 between radially outer and inner upstanding circumferential wall portions 54 and 55. The wall portions 54 and 55 function in substantially the same way as the lip 24 of the embodiment of FIG. 1, namely, to inhibit insertion of the end of a wire or the like into the float valve chamber 7. To minimize disruption to the fluid flow, the ring 52 is provided with a circumferential array of bores 56 which open into the channel 53 to allow fuel to flow while obstructing the end of any wire or the like that might be inserted into the annular passage 23. The internal diameter of the ring 52 is smaller than the maximum diameter d of the obstruction 21a, further blocking line of sight or direct path from the inlet pipe 5 to the valve chamber 7.

For the embodiment illustrated in FIG. 4, the diameter of the open end of the inlet pipe 5 is defined by the internal diameter of the ring 51, and the diameter of the opening to the valve assembly 7 is effectively defined by the internal diameter of the ring 52. It is further noted that the float valve assembly depicted in FIG. 4 is a schematic representation. As a person having ordinary skill in the art will readily understand, the depicted float valve assembly would include a valve seat (not shown), e.g., disposed on float valve chamber 7, and located above and engageable with float ball 6. When float ball 6 floats to the upper end of float valve chamber 7, float ball 6 will engage the valve seat and prevent the flow of fluid from float valve chamber 7 upward into annular chamber 23. When the float ball 6 is in the lower portion of float valve chamber 7, float ball 6 will disengage from the valve seat (not shown) and allow the passage of fluid between annular chamber 23 and float valve chamber 7 and the interior volume of the tank.

It will be appreciated that the ring 50, and the ring 52, can be incorporated into embodiments of the present invention independently from one another. However, the illustrated embodiment of FIG. 4 combines the ring 50, the grill 3, the obstruction 21, and the ring 52 to provide an anti-siphon device which in testing has been very effective at preventing tampering.

Another innovative feature of the inlet assembly shown in FIG. 4 is the provision of an internal annular flange 30 towards the inlet end of the tubular body 5. The annular flange 30 defines a circular opening of sufficient size to receive a conventional fuel filler dispenser while leaving a small air gap between the dispenser and the radially inner edge of the flange 30. The flange 30 functions very effectively as a guard against splash back as fuel is dispensed into the inlet. The gap between the flange 30 and the dispenser nozzle ensures that sufficient air can escape to allow the fuel tank to fill effectively.

Figure 7:
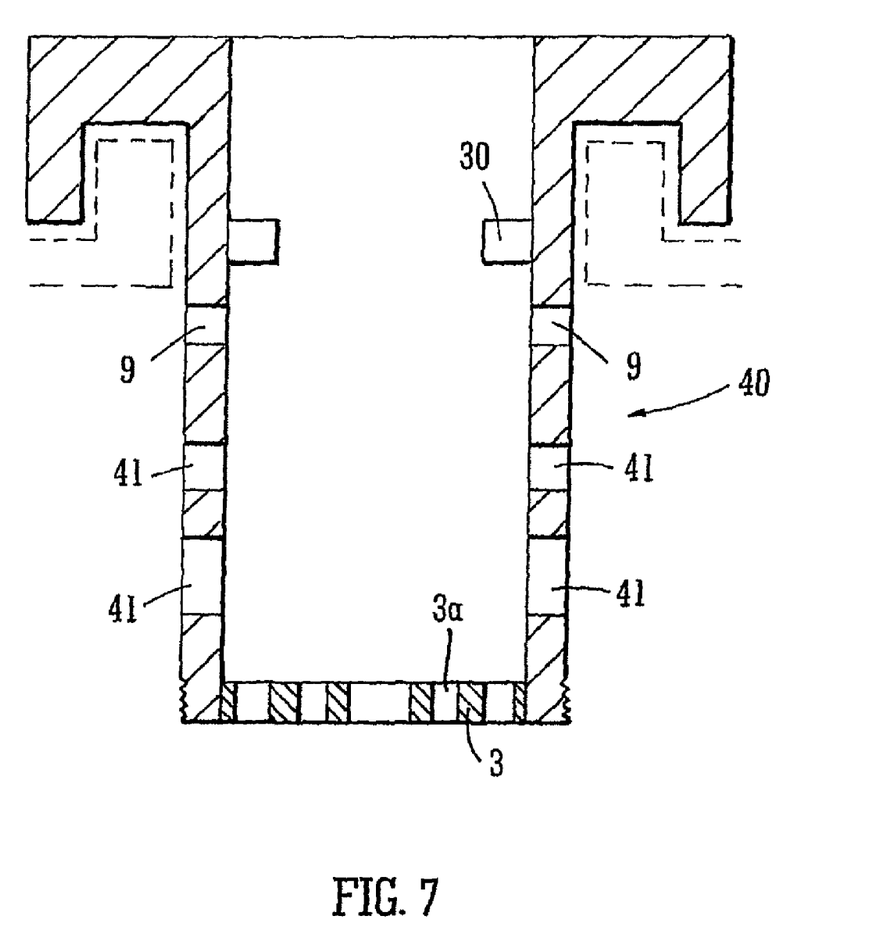
FIG. 7 is a cross-sectional view of a second embodiment of a fluid tank inlet assembly.

The provision of the internal annular flange 30 is an independent aspect of the present invention which can be included in other inlet designs not, for example, comprising the anti-tamper means 20 or a float valve assembly. Such an embodiment of the invention is illustrated in FIG. 7. In this embodiment, a relatively short inlet assembly comprises a tubular member 40 similar to the inlet pipe 5 of FIG. 1, except that it is additionally provided with flow holes 41 to allow sufficient flow of fuel through the inlet. In the absence of the annular flange 30 providing a splash back guard, it would be necessary to provide a longer length inlet tube in order to ensure there is not an unacceptable degree of splash back out of the inlet as the tank is being filled. This is particularly problematic with anti-siphon arrangements which by necessity do present some obstruction to the flow of fluid into the tank so that fluid can well up within the inlet assembly. The advantage of shortening the length of the inlet above the grill 3 is that the volume of fuel that could be siphoned off is reduced, as only that fuel above the level of the grill can be siphoned.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid tank inlet assembly, comprising:
   an inlet pipe extending from a mounting structure located at a proximal end of the inlet pipe;
   a float valve assembly disposed beyond a distal end of the inlet pipe and including a float member;
   an obstruction positioned within a housing and disposed between the inlet pipe and the float member, wherein the obstruction blocks all direct paths from the inlet pipe to the float member wherein the obstruction is permanently fixed and does not move relative to the housing; and
   the obstruction and a wall of the housing defining a flow path therebetween, the flow path surrounding the obstruction and allowing fluid to flow between the inlet pipe and the float valve assembly.

2. The fluid tank inlet assembly of claim 1, wherein the flow path comprises an annular flow path.

3. The fluid tank inlet assembly of claim 2, wherein a radial width of the annular flow path varies along the axial length of the housing, the radial width decreasing from a proximal end of the housing to a minimum width and increasing from the minimum width to a distal end of the housing.

4. The fluid tank inlet assembly of claim 1, wherein the obstruction blocks the direct path between an opening at the proximal end of the inlet pipe and the float member.

5. The fluid tank inlet assembly of claim 1, wherein the obstruction blocks the direct path between an opening at the distal end of the inlet pipe and the float member.

6. The fluid tank inlet assembly of claim 1, wherein the inlet pipe has an opening at its proximal and distal ends, the opening at the proximal or distal end of the inlet pipe defined by an annular member located within or adjacent to the respective end of the inlet pipe.

7. The fluid tank inlet assembly of claim 1, wherein the wall of the housing comprises an annular lip disposed between a portion of the obstruction having a maximum diameter and the float valve.

8. The fluid tank inlet assembly of claim 1, further comprising an annular ring having a radial width and a central aperture to allow fluid flow to the float valve assembly, the annular ring including a circumferential array of axial bores each having a diameter less than the radial width of the ring to allow fluid flow therethrough.

9. The fluid tank inlet assembly of claim 8, wherein the ring has an annular channel defined within the radial width, the bores being defined within the annular channel.

10. The fluid tank inlet assembly of claim 1, wherein the float valve assembly comprises the float member enclosed within a float chamber and an annular valve seat disposed at an entrance to the float chamber, the annular valve seat defining an opening to the float valve assembly through which fluid flows from the housing.

11. The fluid tank inlet assembly of claim 1, further comprising an inwardly tapering annular surface positioned near the distal opening of the inlet pipe and defining an opening through which fluid flows from the inlet pipe to the housing.

12. The fluid tank inlet assembly of claim 11, wherein the tapering surface is defined by a ring secured in or adjacent the open distal end of the inlet pipe.

13. The fluid tank inlet assembly of claim 1, wherein the housing is a separate component connected between the inlet pipe and float valve.

14. The fluid tank inlet assembly of claim 1, wherein the inner diameter of the housing varies along its axial length, the inner diameter increasing between the proximal end of the housing to a portion having a maximum diameter and decreasing between the portion having the maximum diameter to the distal end of the housing.

15. The fluid tank inlet assembly of claim 14, wherein the maximum diameter of the housing is greater than the diameter of an opening at the distal end of the inlet pipe or the diameter of an opening at the proximal end of the float valve assembly.

16. The fluid tank inlet assembly of claim 1, wherein the wall of the housing is substantially cylindrical and has a substantially constant diameter along its length.

17. The fluid tank inlet assembly of claim 1, wherein the obstruction has an outer surface that promotes fluid flow between the obstruction and the wall of the housing.

18. The fluid tank inlet assembly of claim 1, wherein the obstruction has a diameter which increases from its proximal end to a portion of the obstruction having a maximum diameter and decreases from the portion having the maximum diameter to its distal end.

19. The fluid tank inlet assembly of claim 18, wherein the obstruction is generally oval or egg-shaped.

20. The fluid tank inlet assembly of claim 18, wherein the obstruction comprises a double cone cross-section.

21. The fluid tank inlet assembly of claim 1, wherein the obstruction has a substantially circular cross-section along its axial length.

22. The fluid tank inlet assembly of claim 1, further comprising a blocking member disposed within the inlet pipe.

23. The fluid tank inlet assembly of claim 1, further comprising a blocking member disposed within the housing below the obstruction.

24. The fluid tank inlet assembly of claim 23, wherein the blocking member is a grill or apertured baffle.

25. The fluid tank inlet assembly of claim 1, further comprising an internal annular flange disposed near the proximal end of the inlet pipe, the annular flange defining an opening to receive a fluid dispensing nozzle.

26. The fluid tank assembly of claim 1, wherein the obstruction is positioned substantially centrally with respect to the housing.

27. The fluid tank assembly of claim 1, wherein the obstruction is spaced from the housing.

28. A fluid tank inlet assembly, comprising:
a pipe having an inlet and an outlet, the inlet having a mounting member adapted to couple to an inlet of a fluid tank;
a housing having an entrance opening disposed at the outlet of the pipe; and
an obstruction spaced from the housing which blocks all direct paths between the inlet of the pipe and an exit opening of the housing, wherein a flow path is defined between the obstruction and a wall of the housing to permit fluid flow around the obstruction wherein the obstruction is permanently fixed and does not move relative to the housing and wherein the flow path is symmetrical around the obstruction; and
a float valve assembly disposed at the exit opening of the housing.

29. The fluid tank inlet assembly of claim 28, wherein the float valve assembly includes a cage and float member.

30. The fluid tank inlet assembly of claim 28, wherein the wall of the housing comprises an annular lip.

31. A fluid tank inlet assembly, comprising:
a pipe having an inlet and an outlet, the inlet having a mounting member adapted to couple to an inlet of a fluid tank;
a housing having an entrance opening disposed at the outlet of the pipe; and
an obstruction spaced from the housing which blocks all direct paths between the inlet of the pipe and an exit opening of the housing, wherein a flow path is defined between the obstruction and a wall of the housing to permit fluid flow around the obstruction and wherein the obstruction is permanently fixed and does not move relative to the housing;
a float valve assembly disposed at the exit opening of the housing; and
wherein the obstruction comprises a substantially oval or double cone shape.

32. The fluid tank inlet assembly of claim 28, further comprising a grill or apertured baffle plate.

33. The fluid tank inlet assembly of claim 28, further comprising a flange disposed near the proximal end of the inlet pipe, the flange defining an opening to receive a fluid dispensing nozzle.

34. The fluid tank inlet assembly of claim 28, wherein a portion of the obstruction comprises a diameter greater than the outlet of the pipe or exit opening of the housing.

35. A fluid tank inlet assembly, comprising:
a pipe having an inlet and an outlet, the inlet having a mounting member adapted to couple to an inlet of a fluid tank;
a housing having an entrance opening disposed at the outlet of the pipe; and
an obstruction spaced from the housing which blocks all direct paths between the inlet of the pipe and an exit opening of the housing, wherein a flow path is defined between the obstruction and a wall of the housing to permit fluid flow around the obstruction and wherein the obstruction is permanently fixed and does not move relative to the housing;
a float valve assembly disposed at the exit opening of the housing; and
wherein the wall of the housing comprises an annular lip disposed between the exit opening and a portion of the obstruction having a maximum diameter.

36. The fluid tank inlet assembly of claim 28, further comprising an inwardly tapering annular surface positioned near the inlet of the pipe and defining an opening through which fluid flows from the pipe to the housing.

37. The fluid tank inlet assembly of claim 28, wherein the wall of the housing is substantially cylindrical and has a substantially constant diameter along its length.

38. The fluid tank inlet assembly of claim 28, wherein the obstruction has an outer surface that promotes fluid flow between the obstruction and the wall of the housing.

39. The fluid tank inlet assembly of claim 28, wherein the obstruction is disposed substantially centrally within the housing.

40. The fluid tank inlet assembly of claim 28, wherein the flow path comprises an annular flow path.

41. A fluid tank inlet assembly comprising:
an inlet pipe having a proximal end and a distal end, the inlet pipe attached to a mounting structure near the proximal end;
a float valve assembly disposed beyond the distal end of the inlet pipe and including a float member;
a fixed obstruction located within a housing disposed between the proximal end of the inlet pipe and the float member wherein the obstruction is permanently fixed and does not move relative to the housing;
wherein the obstruction blocks all lines of sight from an opening at the proximal end of the inlet pipe to the float member; and in that a flow path is defined between the obstruction and the housing wall to allow fluid flow to the float valve assembly around the obstruction and wherein the flow path substantially surrounds the entire obstruction.

* * * * *